United States Patent
Toivonen et al.

(10) Patent No.: US 9,280,607 B2
(45) Date of Patent: Mar. 8, 2016

(54) METHOD AND A DEVICE FOR FREQUENCY COUNTING

(75) Inventors: Hannu Toivonen, Helsinki (FI); Antti Sorvari, Itäsalmi (FI); Markus Kähäri, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 2036 days.

(21) Appl. No.: 10/548,741

(22) PCT Filed: Mar. 7, 2003

(86) PCT No.: PCT/FI03/00177
§ 371 (c)(1),
(2), (4) Date: Jun. 19, 2006

(87) PCT Pub. No.: WO2004/079597
PCT Pub. Date: Sep. 16, 2004

(65) Prior Publication Data
US 2007/0033275 A1    Feb. 8, 2007

(51) Int. Cl.
*G06F 15/173*   (2006.01)
*G06F 17/30*    (2006.01)

(52) U.S. Cl.
CPC .................. *G06F 17/30884* (2013.01)

(58) Field of Classification Search
CPC ...... H04L 43/06; H04L 43/062; H04L 43/065
USPC ........................................................ 709/224
See application file for complete search history.

(56) References Cited

U.S. PATENT DOCUMENTS

| | | | |
|---|---|---|---|
| 5,285,323 A * | 2/1994 | Hetherington et al. | ........ 711/122 |
| 5,935,207 A * | 8/1999 | Logue et al. | .................. 709/219 |
| 6,125,392 A | 9/2000 | Labatte et al. | |
| 6,564,213 B1 * | 5/2003 | Ortega et al. | |
| 2002/0184568 A1 | 12/2002 | Kurrasch | |

FOREIGN PATENT DOCUMENTS

| | | | |
|---|---|---|---|
| GB | 2373679 A * | 9/2002 | ............... H04Q 7/22 |
| WO | WO 0133413 | 5/2001 | |

OTHER PUBLICATIONS

Multilevel Staging Memory Control to Prevent Data Loss, Publication Data: IBM Technical Disclosure Bulletin, Aug. 1977, US vol. 20, Issue No. 3, pp. 927-930, Publication Date: Aug. 1, 1977.*

(Continued)

*Primary Examiner* — Sulaiman Nooristany
(74) *Attorney, Agent, or Firm* — Alston & Bird LLP

(57) ABSTRACT

A memory efficient method and electronic device for counting frequencies of various events. The structure for storing frequency data comprises primary (204) and secondary (206) storages which contain frequency data (208, 210, 214) in different levels of detail. The primary storage (204) is a detailed storage comprising both event type and count information units in a fully restorable form. The secondary storage (206) is targeted for more infrequent events with lower level of detail and constructed as an array of count values addressed by a hash function using event type as an input. Another option is to derive a shortened ID from the event type by utilizing a hash function and exploit the ID as an addressing key for the corresponding count. Events are moved between primary (204) and secondary (206) storages depending on the detected event type frequencies. The invention is utilized in a recommendation engine for grading and sorting bookmarks stored in browsers for accessing the Internet.

49 Claims, 7 Drawing Sheets

(56) References Cited

OTHER PUBLICATIONS

"Exploring Users' Experiences of the Web;" B. Brown & A. Sellen; First Monday, 2001; www.firstmonday.org; retrieved from the Internet on Nov. 17, 2006.

"What do Web Users Do? An Empirical Analysis of Web Use;" A. Cockburn & B. Mckenzie; Int. J. Human-Computer Studies; 2000; www.cosc.canterbury.ac.nz/~andy/papers/ijhcsAnalysis.pdf; retrieved from the Internet on Nov. 17, 2006.

"WAP Usability;" Field study report; M. Ramsay & J. Nielsen; 2000; retrieved from the Internet on Nov. 17, 2006.

* cited by examiner though the corresponding www site/page has been accessed many times before. Many other approaches for defining event types are definitely available.

METHOD AND A DEVICE FOR FREQUENCY COUNTING

CROSS REFERENCE TO RELATED APPLICATIONS

This application is for entry into the U.S. national phase under §371 for International Application No. PCT/FI03/000177 having an international filing date of Mar. 7, 2003, and from which priority is claimed under all applicable sections of Title 35 of the United States Code including, but not limited to, Sections 120, 363 and 365(c).

TECHNICAL FIELD

The present invention relates generally to a method and a device for frequency counting of various events. In particular the invention concerns grading and sorting of bookmarks stored in browsers for accessing the Internet.

BACKGROUND OF THE INVENTION

During the last decade the overall need for storing and classifying information has grown tremendously. Phenomenon has arisen not least on the Internet, the massive archive of information and, unfortunately, also disinformation. People tend to entertain themselves by surfing on the net and seek for news, interesting gossips, hobby related stuff, discussion areas, pen pals etc without forgetting the important issue of finding specific information on some current and bothering matter. Quite often certain pages and sites find their way into one's favorite or "top" link list by being stored as a so-called bookmark in the web browser. Subsequently the pages can be cleverly found by selecting corresponding links from the list of said stored bookmarks. Bookmarks typically contain a name for identification purposes and a URL (Uniform Resource Locator) leading to the destination site and/or page, and they are depicted as a line of successive link elements or sometimes as a more descriptive tree structure of nodes and leafs comprising said elements. When a number of bookmarks have been organized in the tree structure by some criteria, for example, a link class which refers to the subject matter of referred pages utilizing e.g. "news", "sports", "hobbies", or "work" as node names, the pages can be easily and rapidly found from the connected leafs. FIG. 1 illustrates a scenario wherein a site map of a WAP (Wireless Application Protocol) portal (Excite) has been presented as a hierarchical tree structure in addition to some other preferred, independent sites mentioned on the left. The scenario is congruent with the way bookmarks often are visualized in the browsers.

However, traditional web browsers do not classify or sort bookmarks without specific guidance, and the user has to execute the procedure manually by creating the tree structures and inserting the link elements into proper slots. Active web surfers search actively new interesting pages and their bookmark collection can easily grow up to several hundreds or even thousands of links. It is obvious that nobody can keep up organizing that huge number of bookmarks and eventually the manual sorting procedure is probably fully abandoned as a waste of time.

Sony-Ericsson has launched a new I-mode dual band phone called "MOVA SO 211i" containing a new feature called "e-mail ranking" which lists mail addresses in the order of frequency. Especially in mobile phones, which provide generally only limited data visualization means such as a small display to a user, the features, which help the user to quickly adopt the data they need from a bunch of other data, are vital.

One problem with manual sorting of information is founded on aforesaid fact that the generated tree structure typically reflects only factual bonds, e.g. division based on the subject matter: hobbies, news, work, main page vs. sub page relations etc, between the tree elements. Hence, the corresponding temporal or statistical interrelations are not saved. These temporal aspects, for example when was a certain web page last used, or statistical aspects, such as ranking of stored links by the total number of accesses made etc, may be in many cases more valuable to the information seeker than the factual one.

For example, the problem of Internet service management/bookmarking has been reported in many independent studies [1-3] showing that the preferred content has to be easily accessible for each user and useful services are revisited frequently as up to 81% of page visits in the wired web seem to be revisitations. Furthermore, manual management of bookmarks is difficult even in PCs with rich UIs (User Interface) and solutions should work over multiple services as the users access a wide range of specific services selectively instead of using just one portal. Moreover, users are also concerned about their privacy resulting low trust on pure server-side solutions. Many of the listed results originate from the fixed Internet usage. However the need for adaptivity in service management/bookmarking is particularly strong in mobile devices, which have limited UI and computational capabilities mostly due to their small size.

SUMMARY OF THE INVENTION

The object of the present invention is to alleviate the aforesaid problems and offer an automated solution for frequency counting of various events. The object is achieved with a method and a device arranged to store the event frequencies at least on two levels of detail. The first and more detailed level is used for the events occurring frequently, whereas the information about infrequent events is maintained in a less detailed secondary storage. The method accommodates to changes in the set of most frequent event types. This is achieved by moving event types between the primary and secondary storages. The method may also allocate more weight to recent events over former ones in order to support fast adaptivity to changes in the event frequencies. The solution is computationally lightweight and the memory requirements thereof are reasonably low as well. Examples of the industrial applicability of the invention include e.g. browser recommendation engine, redialler, phone menu access, file access, voice commands, handwriting recognition and autocompletion. The invention is suitable for implementation in a portable device such as a PDA (Personal Digital Assistant) or mobile terminal, unlike computationally more demanding approaches designed for standard desktop computers.

The term "event" refers herein to an action noticeable and countable by the frequency counting method.

The term "event type" refers to an event separable from other events by some event specific property. Thus there may be just one or a plurality of partially differing events mapped under the same type.

Event types are advantageously definable by the user and may indicate, for example, a single www site/page access in which case every time when a certain www site/page is accessed, the count of that specific site/page (event type) is increased. Alternatively or additionally, just a common count for all the accessed www sites/pages, is increased if same event type definition applies for all the accessed sites/pages. Therefore, in general terms event type definitions are either narrow (e.g. a certain URL or launch of a certain program is an event type as such) or broad (event type is "a web page access" or "a program launch" independent of which page/ program was actually accessed/launched). Both aforesaid (narrow/broad) event type definitions may also be used within a same frequency calculation entity. Furthermore, in the case of e.g. Internet browsing, it would be annoying to manually define all the event types (sites/pages) targeted for frequency calculation, thus the event type definition should be carried out at least partly automatically and/or dynamically. For example, if Internet accesses are monitored by the frequency counting method, a new site/page (or corresponding URL) can automatically be recognized as a new event type the frequency of which is to be counted if specific predefined conditions (e.g. certain URL's are excluded from the calculation etc) do not apply.

The term "event frequency" refers to a number of event occurrences detected by the frequency counting method. Such events may include: hit to a (certain) web page, program launch, opening a mail etc. as described above. However, with some events the concept of "frequency" may be more straightforwardly linked to its traditional and narrow meaning if, for example, an event is defined in relation to time like "characters typed per hour". An event counting may, anyhow, be further limited by introducing, possibly event specific, additional rules to the counting method based on e.g. users' preferences. For example, if an overall amount of hits to a certain web page is to be counted, it may be more informatory to add a count of that event only once per session or once per hour so that successive hits do not unnecessarily increase the count if the page is repeatedly loaded just for accessing its subpages.

The invention offers several advantages over manual frequency counting and bookmarking. The number of possible event types is in principle unlimited and, for example, in a browser recommendation engine the number of different URLs (Universal Resource Locator) can be considerably large depending on the current memory and computational capacity of the device implementing the method of the invention. The method is incremental, allowing frequency counting with minimal effort as events are observed. In the case of the recommendation engine, the browser passes each accessed URL to said engine which can be queried at any time for the best ranked URLs. The user does not need to explicitly bookmark pages anymore. Additionally, the invention provides adaptive access to a large number of services, not just the ones supported by a certain portal or search engine, and also across different carriers (data call, Bluetooth, WLAN: Wireless Local Area Network, etc) Considering data security issues, high level privacy is resulted: all the data may be stored in a device, e.g. a personal communications device like a mobile terminal, executing the invention, not at the service provider equipment. Furthermore, data may be stored user independently by, for example, allocating separate frequency storages for each user account of the device. Another option is to store the frequency data in a portable media, e.g. a memory card like SIM (Subscriber Identity Module) card which can be easily changed according to the user of the device at that moment. The method can even adapt to a user context as the context information is usually available in the terminals. The invention may exploit appealing and fast user interfaces, e.g. comprehensively tested and trusted terminal UI, instead of case-specific and possibly cumbersome service UIs through the browser, and it can be seamlessly integrated with various terminal applications. As presented above an adaptive browser that is aware of the user's Internet service usage habits thus comprising a recommendation engine of the invention can, help to automate a large part of traditionally manual service management, for example, provide shortcuts to frequently used services, sort bookmarks, propose completely new bookmarks and re-organize and structure access history. Same reasoning also applies to many other situations wherein frequency counting of events is performed.

A method according to the invention for counting frequency of events to be performed by an electronic device capable of processing and storing data, the frequency information being stored in a primary and a secondary storage, comprises the steps of defining at least one event type the frequency of which is to be counted, detecting an event of the type to be counted when occurred, checking if the event type is already included in the primary storage, if included, increasing count for the event type in the primary storage, otherwise updating count for the event type in the secondary storage.

In another aspect of the invention a personal communications device operable in a telecommunications network, comprising processing means and memory means for processing and storing instructions and data, is arranged to define at least one event type the frequency of which is to be counted, detect an event of the type to be counted when occurred, check if the event type is already included in the primary storage, and if included, increase the count for the event in the primary storage, otherwise update the count for the event in the secondary storage.

In one embodiment of the invention a basic frequency calculation method is presented. The primary storage is a table consisting of <event type, frequency> pairs. Event types are presented as character strings. The secondary storage can be constructed in two alternative ways: in first option it is an array of counters, a hash table, indexed by hashing event types. Event types themselves are not stored in the secondary storage. In second option the secondary storage consists of <event type signature, frequency> pairs, wherein the signature is obtained by a hash function. The event type is condensed to a hash value limited to e.g. 4 bytes in length. This solution can also provide accurate frequency information with no or only a few collisions of signatures, depending on the total number of events to be calculated, the exploited hash function and the length of the signature. Additionally, the second option supports sorting of the events in the secondary storage. Also a frequency weighting method is presented as for many adaptive applications the bare frequencies are not very useful and more weight should be given to recent events thus facilitating better overall adaptation to the user's changing interests.

In another embodiment of the invention the invention is implemented especially for a mobile browser recommendation engine thus increasing the accessibility of mobile Internet services by providing-personal adaptive links to ease navigation to services the user tends to visit. Event types represent different URLs. The recommendation engine produces, ranks, orders, and removes recommendations automatically. The engine gives higher priority to pages that have been accessed frequently to provide recommendations that are often useful, to pages that have been accessed recently to adapt to changing interests, and to the first pages of sites to ensure diversity and access to a large number of pages by producing a small number of recommendations from a large number of sites.

Dependent claims disclose some preferred embodiments of the invention.

BRIEF DESCRIPTION OF THE DRAWINGS

Hereinafter the invention is described in more detail by reference to the attached drawings, wherein.

DETAILED DESCRIPTION

Figure 1:
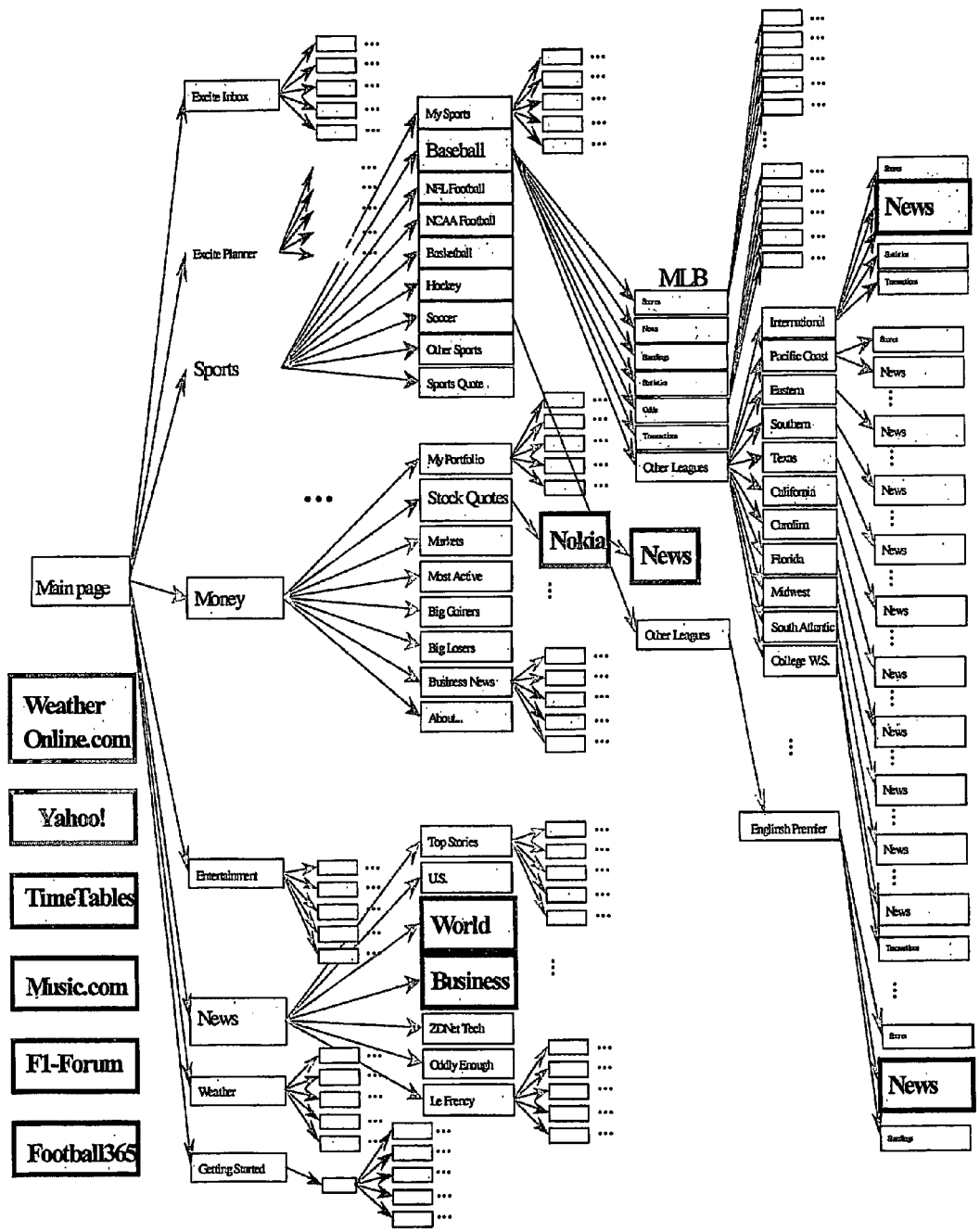
FIG. 1 illustrates a site map of a WAP (Wireless Application Protocol) portal in addition to some independent sites mentioned on the left.

FIG. 1 was already described in conjunction with the description of the prior art. If the total number of links is large enough, the average search time for a certain link inevitably increases despite of more or less complete manual sorting based on e.g. subject matter of the web pages addressed by the links.

Figure 2:
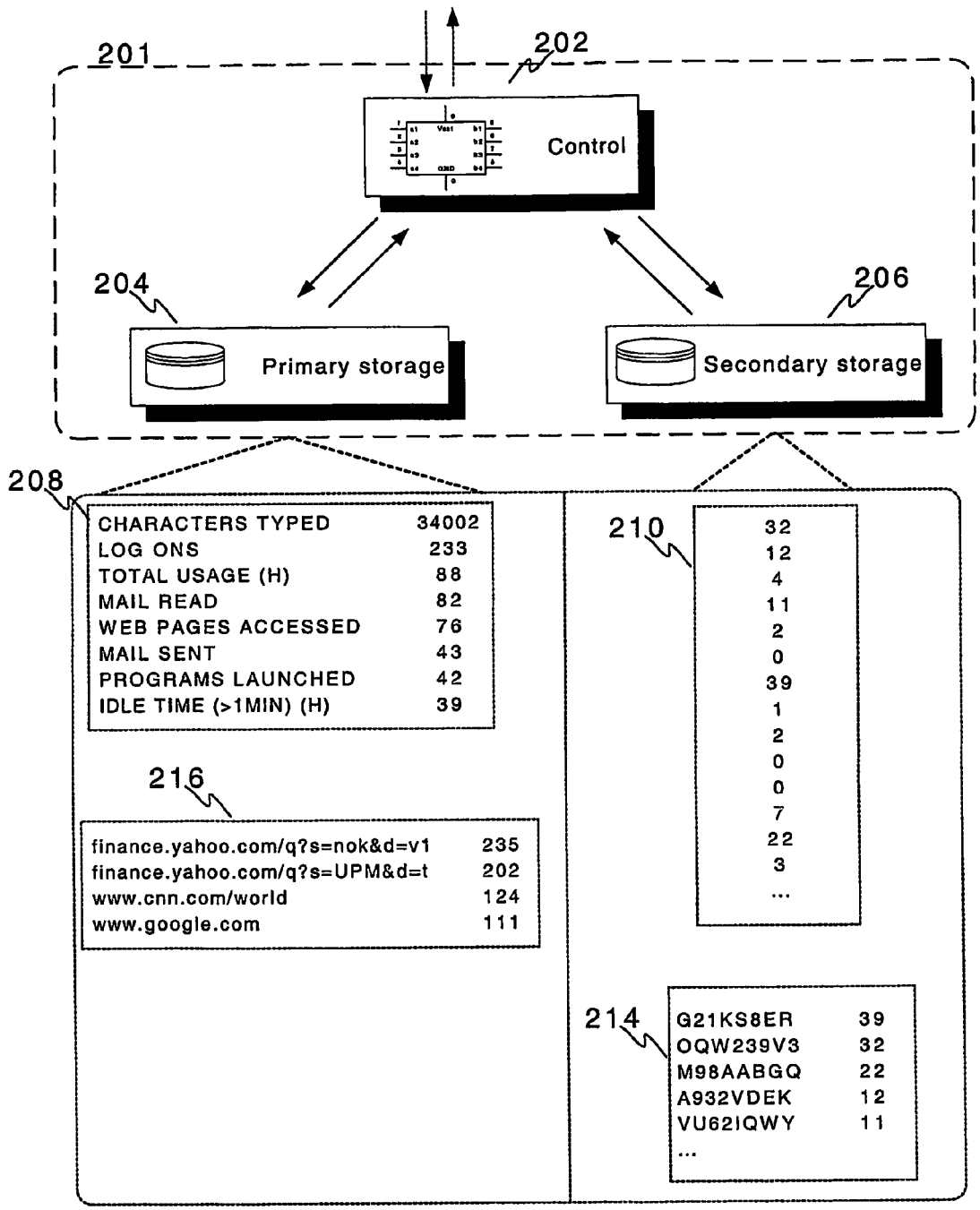
FIG. 2 depicts the overall concept of the invention including essential features like primary and secondary storages and a control entity for executing the proposed method.

Referring to FIG. 2, the basic elements involved in the inventive concept are two storages, a primary storage 204 and a secondary storage 206, responsible for storing the event data, and a control entity 202, which actually performs the procedures required for updating and providing event frequency related information. Storages 204, 206 and the control entity 202 may be included in a same physical device 201 or divided into several devices functionally connected with each other. The primary storage 204 may be structured as depicted 208 including an event type stored as a character string and an overall count of the event type stored as, for example, an integer or a real number. It's also possible to define event type dependent basis for calculating the frequencies as seen in the figure wherein, for example, total usage is measured in hours (time) but web pages accessed is measured in the number of visits. Data in the secondary storage 206 is stored with a lower level of detail possibly comprising only the event counts 210 in a hash table addressable by the hash function utilizing the event type or a derived factor thereof as an input. If some more memory space can be allocated to the secondary storage 206, it is advantageous to store a true identifier for the event types, e.g. a hash value of limited length derived from the event type, see legend 214. Another option 216 to depict internals of primary storage 204 is presented in FIG. 2 as well. In this case the frequency counting method is applied especially for counting the frequencies of Internet site/page accesses. Basically every accessed site/page is treated separately by the counting method as the identification and, at the same time, automatic definition of event types is based on individual URLs of the accessed sites/pages. Site and page frequencies, proportional to each other as obvious, can however be placed into two independent storages if independent frequency calculation of both is preferred. Next, in the first embodiment of the invention, a basic method for frequency counting is described in more detail.

Figure 3:
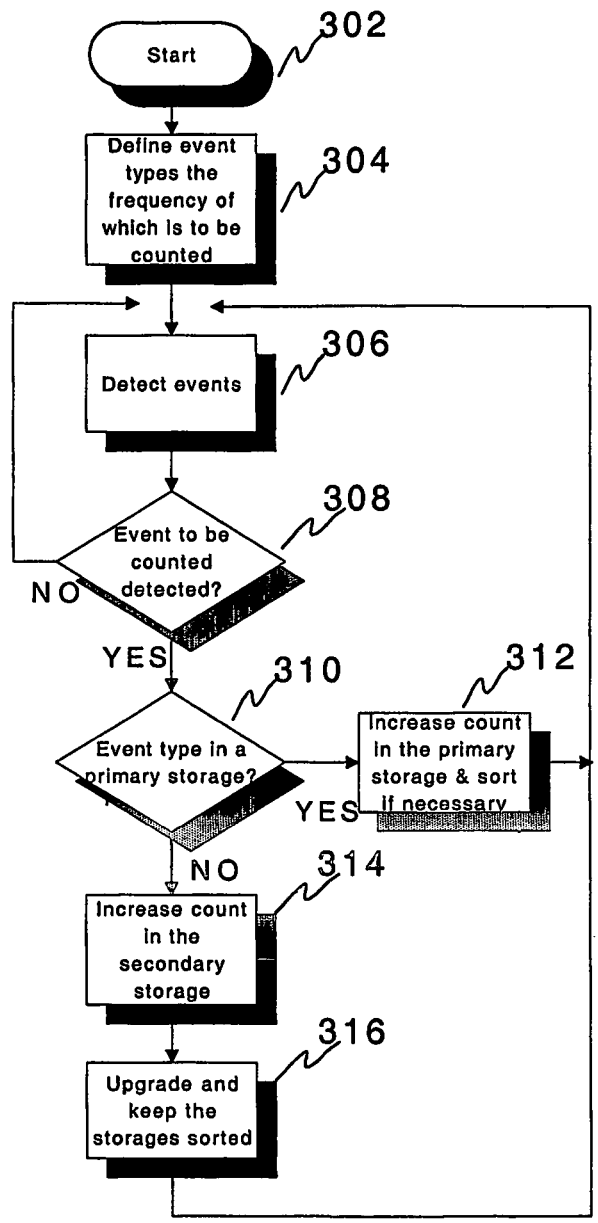
FIG. 3 is a flow diagram disclosing a first embodiment of the invention.

FIG. 3 discloses a flow diagram of the proposed method on a functional level independent of the applied hardware and software solutions. After method start-up 302, the event types the frequency of which is to be counted are defined in phase 304. These event types may be advantageously selected in a flexible manner depending on the prevailing need, for example, including e.g. web pages accessed, web page/site specific access, mail reading/sending, usage time etc. On the other hand and especially if the algorithm is included in a single application like a web browser only, it is advisable that the algorithm has some predefined settings, e.g. event types to be counted, and performs independently even from the start so that the user does not have to spend time with the settings unless he definitely wants to twiddle with those. In phase 306 an event occurs and it is checked by the circuitry/software implementing the invention if the corresponding event type is included in the list of event types to be counted 308. If that is not the case the system merely waits for next event to occur. Meanwhile, if the event type was listed, it is checked by traversing through the primary storage, for example element by element, whether the event type is already included in the primary storage or not 310. A single element in the primary storage may comprise, for example, two information units: a character string for event type identification and the count value as an integer number. If the event type is found, the corresponding count is increased 312 after which the storage elements are resorted to maintain their preferred ordering in the storage, in many cases the most advantageous ordering being a descending one. Otherwise, the count in the secondary storage associated with the detected event type is increased 314 or, alternatively, if the event type is not found at all, a new entry is created and initialised in the secondary storage for the event type.

The addressing mode for accessing the secondary storage depends on the selected storage technique. If the size of separate elements in the storage is to be minimized then the event type may be used as an input for a hash function, which returns an index for the count of the event in the storage. Then the count is increased. In this approach, several event types may have the same hash value, leading to a situation where the corresponding counter reflects the total number of events of all the types that share the common hash value. The counts, when not exact, thus tend to be larger than the real counts. It should be noted that by "hash function" any specific mathematic function commonly known as a hash function is not referred to and there basically are many different but suitable options, although as a generalization functions the output of which exceeds the input in size do not perform well in this type of use as storage space savings are aimed for. The output of a hash function serving as a shortened identifier for the input data (event type or a derivative thereof) can be called, for example, a signature.

Another option to manage a secondary storage is respectively based on calculating hash or corresponding identifier values from the event types but instead of using them to index the secondary storage, the hash values are stored with the event type counts and used as event type identifiers in the secondary storage. Then the resulting hash value/count pairs (storage elements) may be freely sorted in the secondary storage and the total number of elements, in practise defining the storage size, may be adaptively selected as the storage will anyhow carry the most frequent events recognizable by their hash value identifiers. Whenever a count for an event type should be updated but the hash code is not found from either of the storages a new data storage element related to the event type shall be created in the secondary storage comprising a preferred initialization value for the count. Depending on the utilized hash function conflicts may still occasionally occur but they are much less likely than in the first solution. This solution provides more accurate frequency calculation, since collisions are rare. A disadvantage is that given a limited size for the secondary storage, some (low frequency) event types may have to dropped from the storage and are thus lost. Therefore, the counts, when not exact, tend to be smaller than the real counts.

When utilizing the second alternative above for, addressing the secondary storage, elements in the secondary storage are finally sorted in phase 316. In addition to simple frequency updating procedure concerning both of the storages a specific situation may occasionally come up in which the first event type in the secondary storage with apparently increasing count should be moved to the primary storage, whereupon the last event type of the primary storage having more or less dying characteristics shall be moved to the secondary storage. One possibility to deal with the data exchange between the primary and secondary storages may be accomplished after a count has been updated in the secondary storage, for example. The updated count in the secondary storage is compared to the smallest count in the primary storage and if the former is bigger than the latter, the two storage elements including event type and associated count information units are moved between the storages. As the applied storage technique may differ between the primary and secondary storages depending on the implementation, a data conversion may also be needed in exchanging the data. The basic method of FIG. 3 can be modified and extended in many ways as described hereinafter.

The following pseudocode exemplifies a generic structure for an implementation of the proposed memory-efficient frequency counting algorithm and should not be considered as an optimum solution for most of the occasions. Secondly, some actions expressed herein with only a single instruction etc need typically several instructions to be realized properly in the target device. For example, functions "add_one_count" and "count" access the primary storage with the event type as a key, denoted in the pseudocode below as "if there exists i such that primary[i].event_type=e . . . ". If needed for efficiency, access structures such as a hash table or search tree can be used to index the primary storage. In many cases a simple linear search is, however, likely to suffice.

The code contains two global parameters, namely m defining the size of primary storage in <string (event type), integer (count)> pairs and n defining the size of secondary storage in integers indicating counts or in the case of browser recommendation engine, hits to a specific page.

When choosing m and n, a fixed value can be assumed for k which is the number of most frequent event types for which high quality information is required, if only a limited memory space can be used for the primary and secondary storage. Choose m>k, e.g. m=1.5*k. This leaves 0.5*k=0.33*m of the tail of the primary storage as a buffer between the k best frequencies and the secondary storage. Choose n>m, depending on the application and the amount of memory available, e.g. n=10*m. It should be noted that an entry in the primary storage may require magnitudes of more information than an entry in the secondary storage, depending on how long the names of the event types are etc.

The code carries comments marked with double slashes (//) to justify and ease the further understanding of performed actions.

```
// Basic frequency counting pseudocode implementation
Public functions
    init:                        //setup of primary and secondary storages
    add_one_count(string e):     //increase the count of event type e by one
    count(string e):             // return the (approximate) count of event type e
    kth_best(integer k):         //return the kth highest <event type, count> pair, k <= m
Internal functions
    upgrade(integer hash, string e):
                                 //moves the count indexed by hash (last observed as type e)
                                 //from secondary to primary storage and downgrades the
                                 //least count from primary storage to secondary storage
    move_up(integer i):          //keep primary storage sorted by count, after an increase in
                                 //the count of ith event
    hash(string e):              //a hash function from strings to [1,n] (to secondary
                                 //storage)
Data structures
    primary:
//Array of m <string, integer> pairs, representing event types and their counts, sorted in
//decreasing order by count. Contents are referred to by notations primary[i].count (the
//i:th highest count) and primary[i].event_type (the event type which has the i:th
//highest count). Indexing runs from 1 to m.
    secondary:
//Array of n integers (counts), unsorted. Contents are referred to by notation
//secondary[i].count (count associated with the i:th entry in the array). Indexing from 1
//to n.
    function init:           // setup of primary and secondary storages
                             // a) <event type, count> pairs
        primary := array of m <string, integer> pairs;
                             // b) counts
        secondary := array of n integers;
        for (i := 1 to m)
            primary[i].event_type := "";
            primary[i].count := 0;
```

```
        endfor;
        for (j := 1 to n)
            secondary[j].count := 0;
        endfor;
function add_one_count(string e):
                            // increase the count of event type e by 1
        if (there exists i such that primary[i].event_type = e) then
            primary[i].count++;
            move_up(i);
        else
            hash := hash(e);
            secondary[hash].count++;
            if (secondary[hash].count > primary[m].count) then upgrade(hash, e);
        endif;
function count(string e):        // return the (approximate) count of event type e
        if (there exists i such that primary[i].event_type = e) then
            return primary[i].count;
        else
            hash := hash(e);
            return secondary[hash].count;
        endif;
function kth_best(integer k):
                            // return the kth highest <event type, count> pair, k <= m
        if (k <= m and primary[k] !=0) then
            return pair (primary[k].event_type, primary[k].count);
        else
            return pair ("", 0);
        endif;
function upgrade(integer hash, string e):
                            // Moves the count indexed by hash and last observed as
                            // type e from secondary to primary storage and
                            // downgrades the least count from primary storage to
                            // secondary storage.
                            // 1. release space in secondary storage:
        count := secondary[hash].count;
        secondary(hash).count := 0;
                            // 2. copy count from primary to secondary storage:
        down_hash := hash(primary[m].event_type);
        secondary[down_hash] := primary[m].count;
                            // 3. copy upgraded information to primary storage:
        primary[m].event_type := e;
        primary[m].count := count;
        move_up(m);
function move_up(integer i):
                            //keep primary storage sorted by count, after an increase
                            // the count of ith event
        while (i > 1 and primary[i].count > primary[i−1].count)
            swap primary[i] and primary[i−1];
            i−−;
        endwhile;
function hash(string e):
        // a hash function from strings to [1,n] (to secondary storage)
        // A wide variety of suitable hash functions exist as prior art, see e.g.
        //-M.V. Ramakrishna and J. Zobel: Performance in practice of string hashing
        //functions.
        //-Proc. Fifth Int. Conf. on Database Systems for Advanced Applications,
        // Melbourne, Australia, April 1-4, 1997.
        //-D.E.Knuth: The Art of Computer Programming. Volume 3: Sorting and
        //Searching, Addison-Wesley, Reading, Massachusetts, 1973.
        // T.H. Cormen, C.E. Leiserson, and R.L. Rivest: Introduction to Algorithms,
        //MIT press, Cambridge, MA, 1990.
        // A simple and practical method (Ramakrishna & Zobel), using C++ syntax:
        int h =strlen(e);       // int assumed to be 32 bits
        for (char *key = e; *key != 0; key++)
            // ^: bitwise xor; <<: left shift; >>: right shift
            h = h ^ (h << 5 + h >> 2 + *key);
        return (h % n) + 1;
```

As seen from above the basic frequency counting algorithm can be implemented in a simple manner and the interface exploiting the solution may comprise only a few different functions such as one for increasing the count of a certain event type when occurred (add_one_count) and another for retrieving the count of a desired event type (count) in the primary list or correspondingly, data of the kth highest event type (kth_best) being stored in the primary list as well. Recalling that the secondary storage contains only frequencies without actual event data, e.g. names or some other descriptive identifiers, it is not worth retrieving raw frequency data like mere numbers from the secondary storage as such.

Upon detecting an occurring event, the device exploiting the invention is supposed to call the function add_one_count and provide it with a current event type. It is checked by the function if the event type is already included in the primary storage. If so, the count of said event is increased. In this example the increment is fixed (1) but in practise the increment can be made dependent on the event type or some other advantageous factor. Furthermore, an internal function move_up is called to re-sort the primary storage. However, if the event type is not present in the primary storage, the corresponding hash value is calculated by an internal function hash from the event type (or some other original property of that event) and the count in the resulting secondary storage is increased by the selected number, being fixed (1) in this particular example. If the count is high enough to be inserted in the primary storage, an internal function upgrade is called which moves the count to the primary storage and downgrades the lowest count from the primary storage to the secondary storage. Additionally, the upgrade function calls the function move_up to sort the primary storage.

The functions count and kth_best can be realized without great complexity. count traverses through the primary storage and looks for the event given as an input. If found, the corresponding count is returned, otherwise the count is retrieved from the secondary storage by calculating first a hash value from the event type and checking the count. k_thbest simply returns the event type and count of the kth element in the primary storage.

In theory, a minor possibility of a numerical overflow exists whenever a single count is at risk of passing the maximum presentable value of used data type during the add_one_count procedure. In those presumably rare occasions all counts may be scaled down to preserve their mutual ordering but losing the original count statistics, or the data type of the single event type may be changed, if possible, to support bigger values for example from integer to long integer etc.

Next, an alternative implementation for counting frequencies, suited especially for cases where more weight is given to recent events, is presented. This alternative implementation has the following properties:

Counts are stored as real numbers, not integers.

The frequency of an event type can be changed by any real number, not just by 1, thus allowing different weights for different events.

There is an aging mechanism that decreases all counts when time advances. This allows gradual downweighting of older events. The aging factor (typically slightly below 1) is a new global parameter. For efficiency reasons counts are not updated, rather, a correction factor is maintained and used to adjust values at input and output.

The probability of mixing the frequencies of two different event types is extremely low.

The errors made are underestimates of frequencies (however, with an aging factor small enough and reasonable storage sizes, the errors are negligible).

The more accurate frequencies are achieved at the cost of consuming slightly more memory and processing power.

The secondary storage is a table that contains <hash code, count> pairs, sorted in decreasing order by count. The total number of unique hash codes is considerably larger than the size of the secondary storage. The code contains three global parameters, m defining the size of primary storage as in the first option in <string (event type), real (count)> pairs, notice the change from integer to real what comes to the count variable, n defining the size of secondary storage in <long (hash code), real (count)> pairs, and a new variable called p defining an aging factor (real number) by which the counts are downgraded.

In alternative solution a single new public function is introduced in addition to the existing old ones init, add_count (increment not necessarily equal to +1), count, and kth_best:

```
    downweight:   //an aging mechanism, multiply all counts by factor p
Correspondingly, the following new internal functions are introduced in addition to
upgrade, move_up and hash:
        move_down(integer i):
            //keep primary storage sorted by count, after a decrease in the count of i
        move_up_secondary(integer i):
            //keep secondary storage sorted by count, after an increase in the count of i
        move_down_secondary (integer i):
            //keep secondary storage sorted by count, after a decrease in the count of i
        readjust_counts:
            // update all counts with the correction factor f and reset f
Data structures
        primary:
//Array of m <string, real> pairs, comparable to the primary storage in the first
//implementation
        secondary:
//Array of n <long, real> pairs, representing hash codes of event types and their counts,
//sorted in decreasing order by count. Contents are referred to by notations
//secondary[i].count (the i:th highest count in the array) and secondary[i].hash (the
//hash code which has the i:th highest count in the array). Indexing from 1 to n.
        f:
//Correction factor for counts for aging: the adjusted "true" value is f*count. In the
//same way, when a count is incremented by a, the internal value is updated by a/f to
//obtain a value proportional to the internal representation.
//Pseudocode implementation for more versatile frequency counting implementation
//with frequency weighting support.
        function init:                              // setup of primary and secondary storages
            primary := array of m <string, real> pairs;      // <event type, count> pairs
            secondary := array of n <long, real> pairs;      // <hash(event type), count> pairs
            for (i := 1 to m)
                primary[i].event_type := "";
                primary[i].count := 0;
            endfor;
            for (j := 1 to n)
                secondary[j].hash := 0;
                secondary[j].count := 0;
```

```
        endfor;
        f := 1;                                // correction factor for counts
function add_count(string e, real a):
                                // increase (or decrease) the count of event type e by a
    if (there exists i such that primary[i].event_type = e) then
        primary[i].count := primary[i].count + a/f;
        if (a > 0) then
            move_up(i);
        else
            move_down(i);
        endif;
        if (primary[i].count > FLT_MAX/2*p) then
            readjust_counts;       // update counts if accuracy is at stake
        endif;
    else
        hash := hash(e);
        if (there exists i such that secondary[i].hash = hash) then
            secondary[i].count := secondary[i].count + a/f;
        else
            secondary[n].hash := hash;
            secondary[n].count := a/f;
            i := n;
        endif;
        if (secondary[i].count > primary[m].count) then
            upgrade(i, e);
        else
            if (a > 0) then
                move_up_secondary(i);    // sort the secondary storage
            else
                move_down_secondary(i);
            endif;
        endif;
    endif;
function count(string e):          // return the (approximate) count of event type e
    if (there exists i such that primary[i].event_type = e) then
        return primary[i].count*f;
    else
        hash := hash(e);
        if (there exists i such that secondary[i].hash = hash) then
            return secondary[i].count*f;
        else
            return 0;
        endif;
    endif;
function kth_best(integer k): // return the kth highest <event type, count> pair, k <= m
    if (k <= m and primary[k] != 0) then
        return pair (primary[k].event_type, primary[k].count*f);
    else
        return pair ("", 0);
    endif;
function downweight:      // an aging mechanism, multiply all counts by factor p
    f = f * p;       // Do not actually multiply counts, just update the correction factor
    if (f < FLT_MIN*2/p) then      // update counts if accuracy is at stake
        readjust_counts;
    endif;
function readjust_counts       // update all counts with the correction factor f and reset f
                               // to be called when numerical accuracy is at stake
    for (i := 1 to m)
        primary[i].count := primary[i].count * f;
    endfor;
    for (j := 1 to n)
        secondary[j].count := secondary[j].count * f;
    endfor;
    f := 1;
function upgrade(integer i, string e):
    //Moves the count indexed by i and last observed as type e from secondary to
    //primary storage and downgrades the least count from primary storage to
    //secondary storage.
    // 1. release space in secondary storage:
    count := secondary[i].count;
    remove_from_secondary(i); //removes row i from secondary storage and
                //shifts rows [1..i-1] one row down (to rows [2..i])
                //so the first row in secondary storage is empty.
                //function not presented here as considered obvious
    // 2. copy count from primary to secondary storage:
    down_hash := hash(primary[m].event_type);
    secondary[1].hash := down_hash;
    secondary[1].count := primary[m].count;
    move_down_secondary(1);
```

```
// 3. copy upgraded information to primary storage:
    primary[m].event_type := e;
    primary[m].count := count;
    move_up(m);
function move_up(integer i):
    // keep primary storage sorted by count, after an increase in the count of i
    while (i > 1 and primary[i].count > primary[i-1].count)
        swap primary[i] and primary[i-1];
        i--;
    endwhile;
function move_down(integer i):
    // keep primary storage sorted by count, after an decrease in the count of i
    while (i < m and primary[i].count < primary[i+1].count)
        swap primary[i] and primary[i+1];
        i++;
    endwhile
    //Note: no downgrade operation to switch entries in primary and secondary
    //storage if this count is smaller than the largest entry in the secondary storage.
    //Reason: event names for entries in the secondary storage not available.
function move_up_secondary(integer i):
    // keep secondary storage sorted by count, after an increase in the count of i
    while (i > 1 and secondary[i].count > secondary[i-1].count)
        swap secondary [i] and secondary [i-1];
        i--;
    endwhile;
function move_down_secondary(integer i):
    // keep secondary storage sorted by count, after an decrease in the count of i
    while (i < m and secondary[i].count < secondary[i+1].count)
        swap secondary[i] and secondary[i+1];
        i++;
    endwhile;
function hash(string e):
    // a hash function from strings to [1,2^32-1] (to secondary storage)
    // by Ramakrishna & Zobel, using C++ syntax:
    int h = strlen(e); // int assumed to be 32 bits
    for (char *key = e; *key != 0; key++)
        // ^: bitwise xor; <<: left shift; >>: right shift, %: modulo
        h = h ^ (h<<5 + h>>2 + *key);
    return h + 1;
```

As seen from this alternative implementation, frequency weighting can be implemented efficiently by simply updating the correction factor f with common aging factor p whenever a downweight period changes or downweighting is otherwise to be executed. Actual weighting of counts is to be performed only when counts are actually inserted in or retrieved from the primary or secondary storage. Different event types can be weighted independently as function add_count takes the amount of count added as an input parameter thus slightly differing from the function add_one_count of the very basic implementation.

In the second embodiment of the invention above presented basic structure for implementing a multipurpose frequency counting method is specifically targeted to form a core of a browser recommendation engine. The recommendation engine maintains Internet links comprising sites, pages or both by producing, ordering and removing them automatically from the recommendation list. Additionally, frequently and recently accessed sites/pages are preferred to others. The general approach is that each page has a score, reflecting its estimated relevance. Sites that have been recently accessed for the first time are also favoured as the engine should adapt quickly to new interests thus reducing the need for typing the URLs manually. The total score of a site or page naturally increases with frequency, but not necessarily in a linear way.

Figure 4:
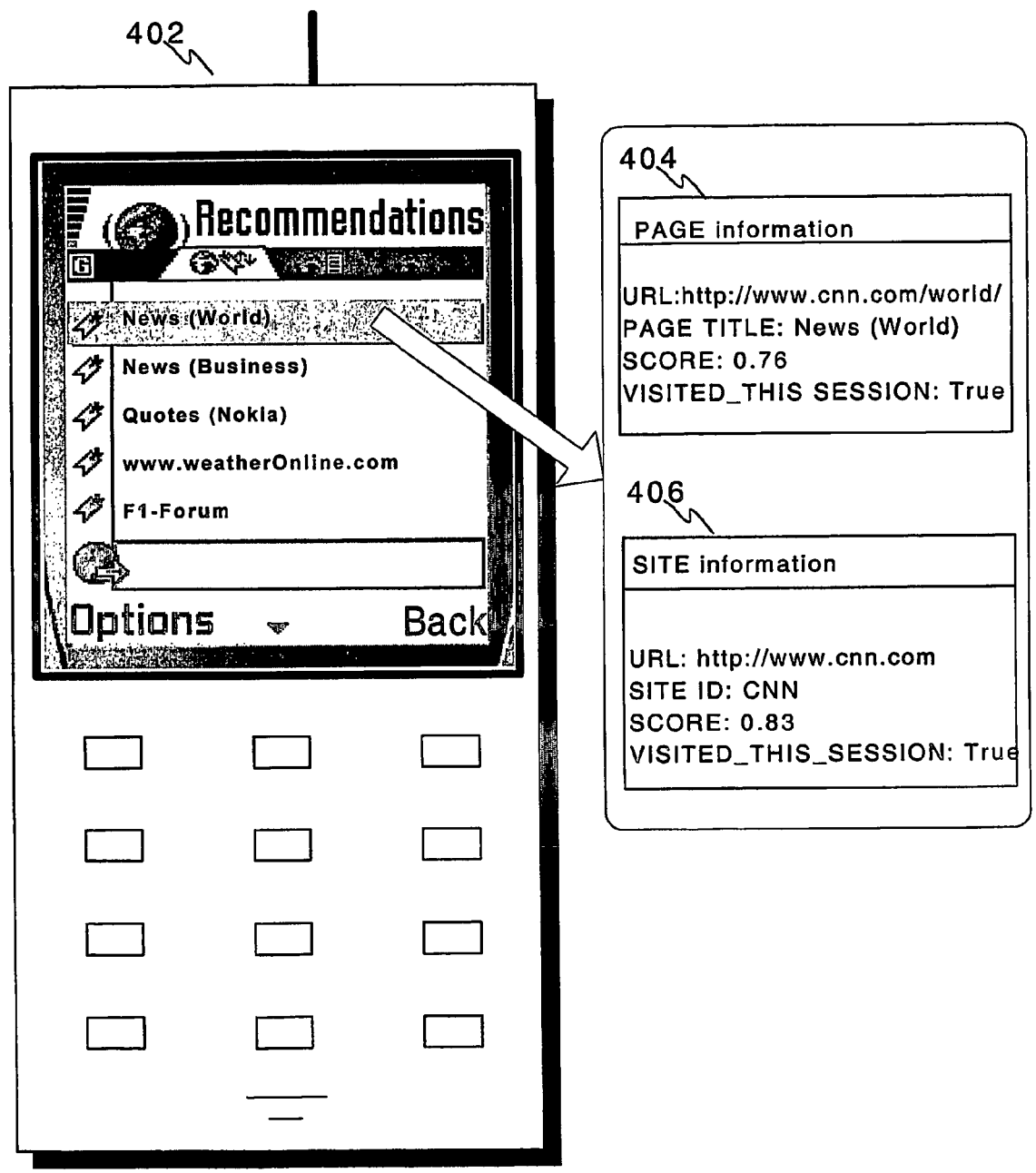
FIG. 4 illustrates a frequency sorted link list on a terminal display.

FIG. 4 discloses an imaginary view on a display of a modern mobile terminal 402 executing the proposed method in accordance with the invention. Accordingly, the Internet pages or sites visited most often can be seen on the top of the link list and be selected without difficulties related to scrolling and wading through a number of all available links. In addition to mere URL information with possibly separately stored site and page partitions, also page name/title (or corresponding) field may be extracted from the HTML code and stored with the frequency data. Alternatively, a user may define an identifier to preferred sites/pages. This either automatically generated or user originated additional identification data is sometimes more descriptive of the target site/page than the URL and may therefore be used together or instead of URL for ranking list visualization purposes as shown in the figure.

The information to be stored per page p 404 may include, for example, a URL, name and score of the corresponding page the URL being stored as a string and used as a page identifier, the name (if found or given any) being stored as a string and the score being stored as a floating point number. Additionally, so-called visited_this_session variable of Boolean type is used for indicating a visit during a current browsing session. Correspondingly, the maintained information per site s 406 comprises the address of the site stored as a string and used for site identification, the score as a floating point number and the visited_this_session variable as a Boolean. Also a separate, possibly user definable, identifier (ID) can be used for e.g. site visualization on a display if seen purposeful.

If above-mentioned data about visited pages and corresponding sites are stored and a need arises to look for frequency sorted pages under a selected site, a search from the page storage can be performed by using site URL as a condition for the elements in the page storage to filter out frequently accessed pages related to other sites.

Useful global data structures include a set of recommended pages (Rec), a set of new pages which have been accessed during the current session (New_Rec), a set of recommended sites (Sites), total number of scores as a floating point number (total.score) and the number of visitations during the session (total.visited_this_session).

The information stored per site is needed if site-level recommendations are implemented. Recommendation main menu may, for example, contain ranked sites, and when a single site is selected by the user the corresponding submenu pops up containing ranked links to pages within the site. The Sites structure may be used also if site-level recommendations are not implemented; however, it does not need to be stored explicitly: {s.address|s in Sites}={address(p.URL)|p in Rec}, i.e. Sites consists of the sites of the stored pages. If recommendations consist only of (re-sorted) bookmarks, then only p.score, p.visited_this_session, total.score, total.visited_this_session are required in addition to data already needed for bookmarks. From the operational viewpoint the aforesaid data structures may be exploited as follows (note that updating the scores can be implemented efficiently with the functions described hereinbefore):

```
-before browsing session:
    set p.visited_this_session = false for all pages p in Rec
    set s.visited_this_session = false for all sites s in Sites
-during session, on request for page p in Rec:
    set p.visited_this_session = true
    set s.visited_this_session = true for the site s of p
    //the score is increased by a certain amount if the page (or site) was
    // visited during a session, regardless of the number of visits
-after session, update all scores and sort:
    for all pages p in Rec: call update_score(p)
    for all sites s in Sites: call update_score(s)
    call update_score(total)
    function update_score(u) {
        u.score = u.score * session_decay_constant
        if u.visited_this_session = true then
            u.score = u.score * frequency_decay_constant + 1
        // the decay_constants between 0 and 1 determine the
        adaptation speed
    sort recommendations p in Rec in descending order by their
    scores p.score.
```

When new pages are visited: during a session, on request for page p not included in Rec or New_rec, a recommendation p is created and inserted in New_rec and the following information is stored:

```
p.URL: URL of the page
p.name: page title (according to a selected naming scene)
p.score = 0      //an individual page is not recommended after
only one visit to it
if address(p.URL) is not in Sites and is different from the sites in
New_rec
set p.score = 1
// a new site is recommended already after one visit, but only the first page
in it
```

If p is already in New_rec, no action is taken. After the session and after recommendation score update for each entry p in New_rec:
    an entry is added for site address(p.URL) to Sites (if not there yet), set s.score=1
    p is added to Rec and removed from New_rec.

Depending on the available memory resources, the space needed by New_rec can be reduced by hashing: for example, URL and name are not stored for new entries, but only a hash key derived from the URL. URL and name are then recorded at the second visit, if there ever is one. A time stamp may be added to the initial data structure to facilitate automated data expiration. For more compression, only k best recommendations are kept in memory with full information, where k is at least as large as the maximum number of recommendations to be shown to the user. The rest of the recommendations are stored using hashing. If a hashed page rises to the top k pages, it is upgraded to the primary storage. Respectively, if a page drops out of the k best ones, it is moved to the hash table. There still remains a possibility of conflicts in the hash table; however, since hashed pages are not visited frequently, the effect is more or less insignificant. The hash table may be small; in practise only a few kilobytes may be enough etc.

Exploited scoring scheme may utilize, for example, exponentially decaying curve. Recall equation p.score=p.score*session_decay_constant from the update_score(u) function resulting that scores decay gradually: latest events have more weight but also old events have some weight. Scores can be adjusted to decay by sessions (session as a sort of time unit), by calendar time (e.g. system clock with date) or by some other preferred reference. When scoring decays by sessions, it actually adapts to usage frequency as well. For any two pages p1 and p2, ratio p1.score/p2.score remains constant and the relative scores of unvisited pages do not change. Page visit in the latest session can be counted as 1 in the score by the following impression
    if p.visited_this_session=true
    then p.score=p.score*frequency_decay_constant+1

Therefore, age score decays gradually when the page is visited and high visit frequencies are down-scaled as, for an example, an increase from 5 visits to 50 may be more significant to the user than an increase from 500 to 550.

When thinking of equation p.score=p.score*decay_constant (covering session and frequency decay constants) and exponential decay; contribution of an event t time units (e.g. sessions) ago can be written score(t)=decay_constant^(t−1). Example: assuming that session_decay_constant=0.9 then
    in the latest session: score(1)=session_decay_constant^(1−1)=1
    in the previous session: score(2)=session_decay_constant^(2−1)=0.9
    10 sessions ago: score(10)=session_decay_constant^(10−1)=0.387.

Alternatively, an equal formulation can be written as score(t)=2^−(t−1)/h. The contribution of a session is halved after h time units and it may be easier to specify the half life h than decay_constant; decay_constant=2^−1/h can be used to obtain the decay_constant. The maximum score, obtained when a page is visited in every session, is limited by the decay constants: for a large score, the drop due to the decay is larger than the addition of 1 to the score.

Denote by p.score' the new score:
    p.score'=p.score*session_decay_constant*frequency_decay_constant+1
    For the maximum score p.score, p.score'≤p.score and thus
    p.score≤1/(1−session_decay_constant*frequency_decay_constant)
    E.g.:
session_decay_constant=frequency_decay_constant=0.9 ⇒ p.score≤5.3.

The range of scores depends on the decay constants and absolute values cannot be compared across different decay constants. A change in the decay constants takes effect gradually since the current values depend on the previous values of the constants.

Figure 5:
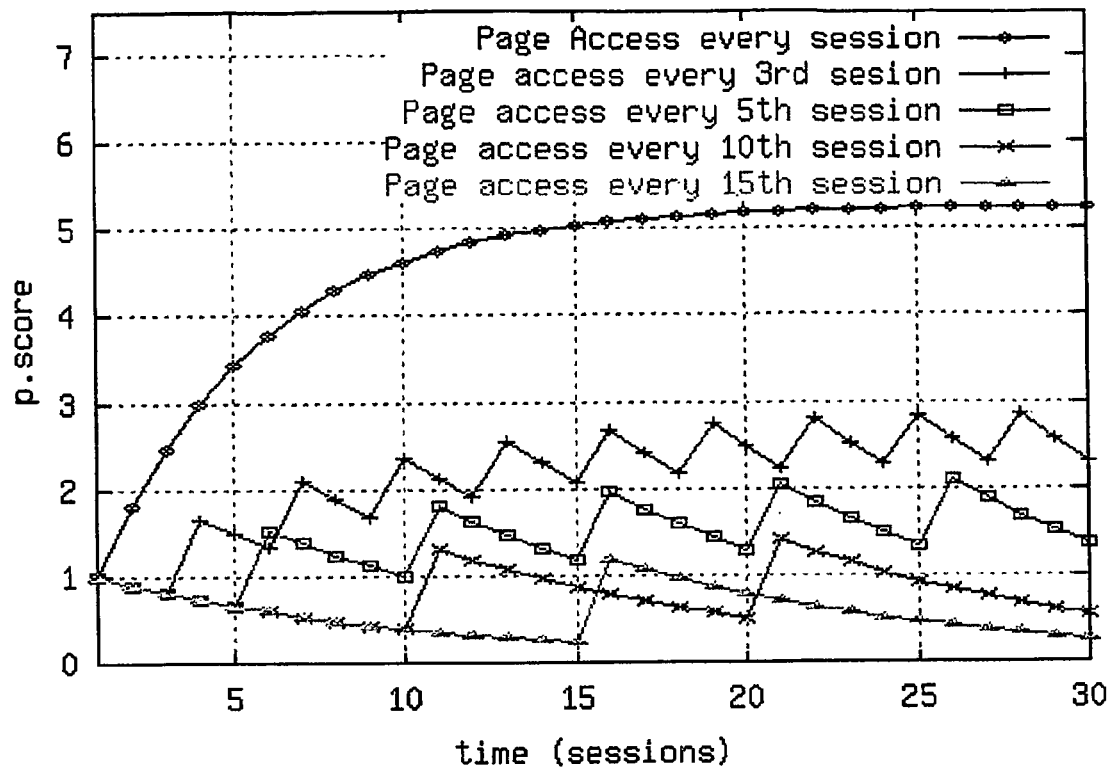
FIG. 5 depicts scores in different usage cases with a fixed decay constant.

See FIG. 5 for an illustration of score curves for pages that are accessed every ith session, i=1, 3, 5, 10, 15. Score jumps higher when the page is visited and decays otherwise. In the figure session_decay_constant and frequency_decay_constant are set equal (0.9; h≈6.6).

In general, probabilities have a more universal interpretation than the raw scores. Page access probability can be calculated by the simple ratio of page and total scores Probability (user visits page p)=p.score/total.score, where total.score is the maximum score that could have been obtained. For example, if recommendations should be very selective, 4 best recommendations with access probability crossing some desired level, e.g. 0.7, might be chosen. Respectively, a site access probability can be calculated by s.score/total.score. Additionally, a conditional probability for two-level recommendation, where page recommendations are made within sites is defined as Probability (user visits page p at site s|user visits site s)=p.score/s.score. This can be exploited to show at most e.g. 2 best recommendations with conditional probability of at least 0.75 for each site already on the first level. After a page visit, the probability of a re-visit to the same page in the same session should be reduced, e.g.: p.score/s.score/2.

Figure 6:
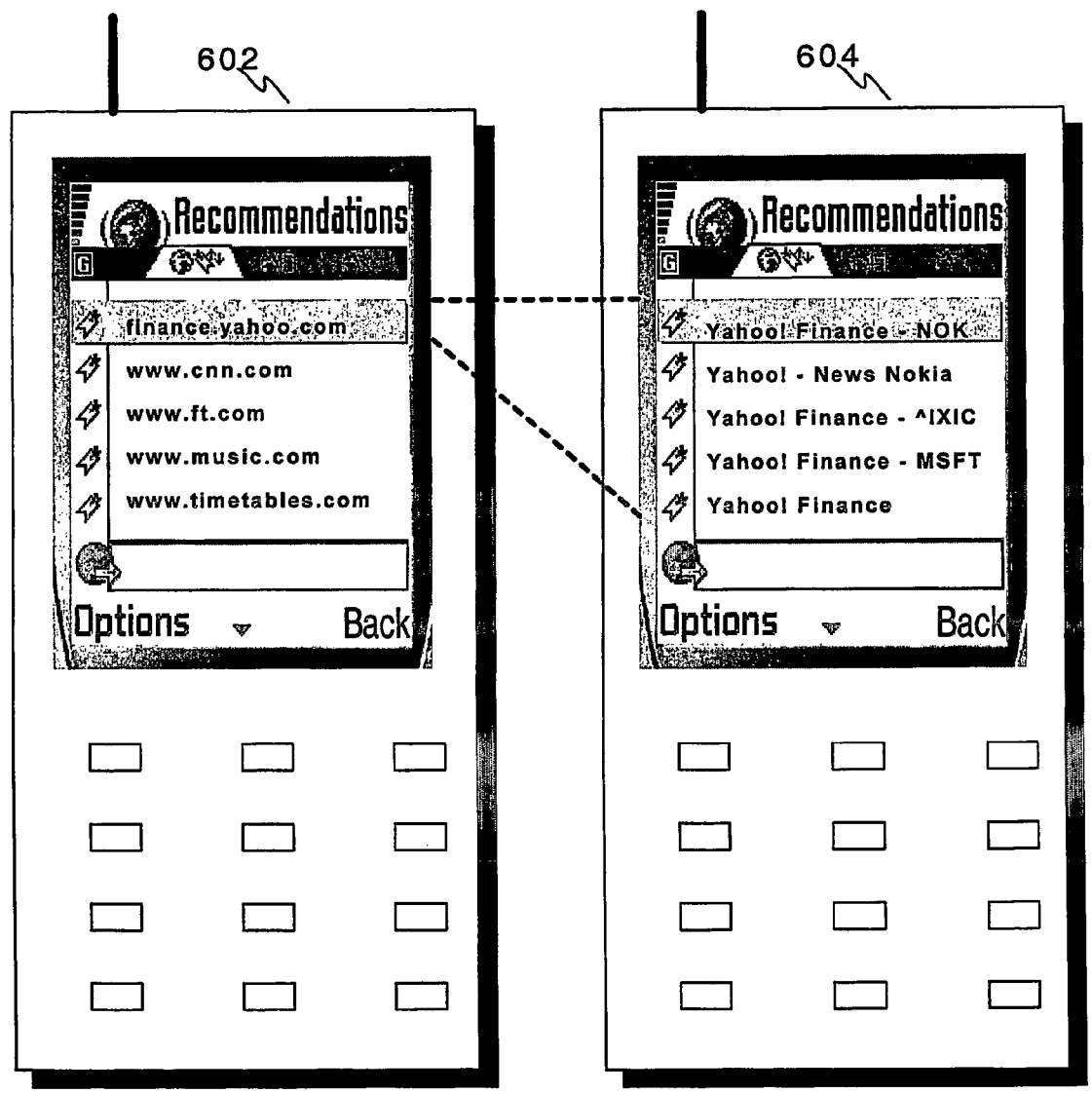
FIG. 6 illustrates frequency sorted URLs on a terminal display with two different views: a site view and a site related page view.

FIG. 6 discloses two alternative views on a mobile terminal display. The view on the left 602 illustrates a recommendation menu listing ranked sites sorted in decreasing frequency count order. The user may then select a preferred site and access a sorted list of pages, see view 604, most frequently and/or recently (e.g. elapsed time measured from last access) visited under the site. This kind of structured approach is simple to use and requires only minimal effort from the user to find a correct link if the link has been visited before. In addition, previously unvisited links can presented e.g. at the bottom of the sorted list so that the user does not have to look for them separately. Advantageously site/page lists can also be explored directly without necessarily leaning on aforesaid hierarchical site and related page type approach.

Referring to previously presented use cases of the invention, further means exist for facilitating easy navigation through frequency-sorted lists. It's e.g. possible to highlight previously accessed or otherwise relevant site/page links with different color(s)/style(s). Site/page highlighting may in some cases be performed automatically by the software, for example, through analyzing a value of a certain HTML tag upon a first access of the site/page and defining the site/page specific highlight variable to be used later in the link visualization. Alternatively, the user may manually define highlighting instructions site/page specifically to be stored with other site/page data.

Furthermore, many Internet pages, especially portal menus, are longish and tricky to display on a small screen thus requiring traversing through multiple screenfuls. As the aforementioned site—page structuralization helps in providing easy navigation through a site and pages thereof, a corresponding (main) page—subpage division can be utilized so that the user is able to access a list of subpage links most frequently (or recently) visited. A subpage as a conceptual entity does not have to be located within a same site or have partially congruent address with the corresponding main page. Meanwhile, a main page is a page comprising links to other pages thereby called subpages of the main page. In a typical scenario the main page of a portal includes links to various subpages the topics thereof vary radically as some of the subpages are news, sport or weather related, some refer to discussion boards with different, often hobby related topics, some are merely sponsor's advertises, and some advertise general notices like a webmaster's bulletin. A single user seldom has interest to actively follow all the subpage links from the portal main page and a discrete group of subpages collecting the vast majority of all link accesses is ultimately formed, in which case it is advantageous upon a page access to illustrate the subpage links in a frequency count (additionally, by the last access date) sorted order. This functionality may be automatic or manual; whenever the user accesses a page comprising links to previously accessed subpages, the sorted list of subpage links is displayed to the user, or alternatively, the page is first shown to the user as such but as a response to a specific user initiated command the subpage links are displayed (e.g. in a compact list including just the URLs or other IDs) to the user as reorganized according to the frequency count and other preferred sorting rules. Aforesaid functionality is reasonably straightforward to implement as if, for example, the accessed page is first automatically traversed through by the control logic in order to find the existing subpage links which are then compared to the links in the storages, and finally a sorted subpage link list is established based on the retrieved frequency counts.

Figure 7:
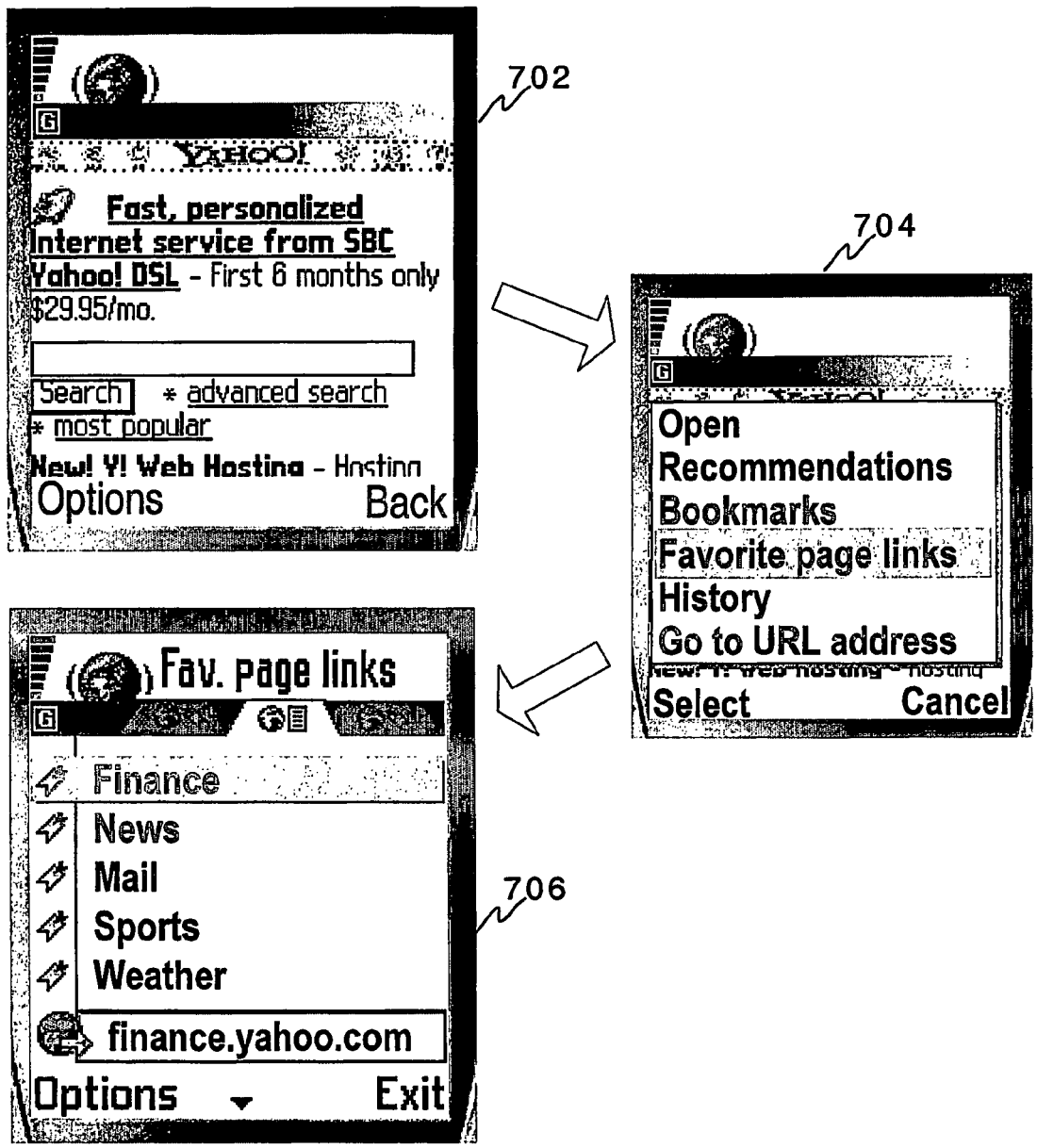
FIG. 7 illustrates a portal main menu as it is and an alternate view of links thereof sorted by the frequency count.

FIG. 7 discloses a view 702 on a mobile terminal display, wherein only a single screenful of the whole portal main menu can be seen at a time. The user may now select a command "Favorite page links" from the terminal menu 704 in order to list the subpage links cleverly in a compact form sorted by the frequency count 706. In this example the subpage links are illustrated by page titles/IDs instead of the actual URL for easier navigability.

One attractive additional possibility to take advantage of the frequency count data concerns text autocompletion, functionality provided by e.g. modern browsers. By autocompletion it is referred to a text predictor engine that completes a partially written character string with probable data on the basis of previously written strings, e.g. stored and frequency counted site/page links. Up to the present and utilizing Internet browser as an example, when multiple options apply, e.g. if the partially written link matches to several previously accessed links what comes to the beginning of the link URL address or ID (or another characteristic string to be completed), the options have been presented to the user in alphabetical order. The autocompletion functionality will benefit from frequency count data as whenever multiple options exist, they can be ranked and presented to the user in a decreasing/increasing frequency count order instead. Additionally, time elapsed from the latest visits or last expression (e.g. when was the URL typed but not necessarily accessed) may be used for creating more sophisticated sorting criteria. In case of Internet links the same data belonging to the set of event types the frequency of which is to be counted can be used for both the link recommendation and autocompletion purposes. Frequency count can be updated normally after link selection performed by the user. Also secondary storage may be exploitable in this purpose although data with lower count values in the secondary storage does not directly affect the actual autocompletion stage, as the essential supplementary text portion for the autocompletion is not available. However, if accessing a link corresponding to a string (defining event type or event type ID) with no counterpart found in the primary storage, a hash value is calculated and a count updated in the secondary storage. Frequently selected string gradually upgrades to the primary storage in accordance with the basic principle of the frequency counting method. Thereafter, the string can also be directly used during the autocompletion stage as it can be found from the primary storage as such. This approach produces better results at least on the average compared to a simple but clearly non-optimum alphabetical order based solution.

As another option, the frequency count method may be used only for organizing links but not for actually defining them. If the user, for example, prefers creating links (bookmarks) manually in a browser, the frequency of link accesses can still be counted as presented hereinbefore. The manually defined links are then displayed to the user as sorted by the frequency count. User definable and automatic link generation may also be combined which offers more flexibility to the overall process; links originating from either of the procedures may be treated equally and presented in a single sorted list, or manually generated links may have priority over automatic ones or vice versa. Manually and automatically generated link data may be stored in the same or separate storages. In practise, with only manually generated links a secondary storage may be useless as the user may want to access and see the stored links straight from the beginning (after link definition which may occur upon a first access) whereas first accesses to a certain page/link in a primary-secondary storage solution typically produce just count values in the secondary storage addressable by a shortened ID or a hash code.

Finally, context information can be taken into account while creating and arranging recommendations that often relate to various services etc. Context adaptation may take place by using e.g. time of day, day of the week, location (e.g. cell ID), connection type/capacity, selected profile etc as a controlling factor. Context dependent generic or site/page specific rules can be defined for storing links or for visualization of links only by filtering out certain links under a certain context, for example. If "work" profile is active, hobby related links will not be displayed etc. Frequency count storages may be constructed profile specifically, or additional weighting terms can be stored with the standard storage element data to indicate the element's importance in relation to different contexts. When visualizing the recommendation list to the user, the current context and corresponding weighting terms may define in addition to the actual count of the event type if the event type is to be shown to the user at all or if the weighted count changes the event's position in the visualized recommendation list. One option is to apply context information directly to the frequency counting process. In a certain context an event of type to be counted may result a bigger increase (or no change or maybe even decrease) in the corresponding count than in some other contexts etc. As a conclusion, the basic frequency counting method of the invention may be flexibly cultivated depending on the scenario to adopt various users' needs even better.

Figure 8:
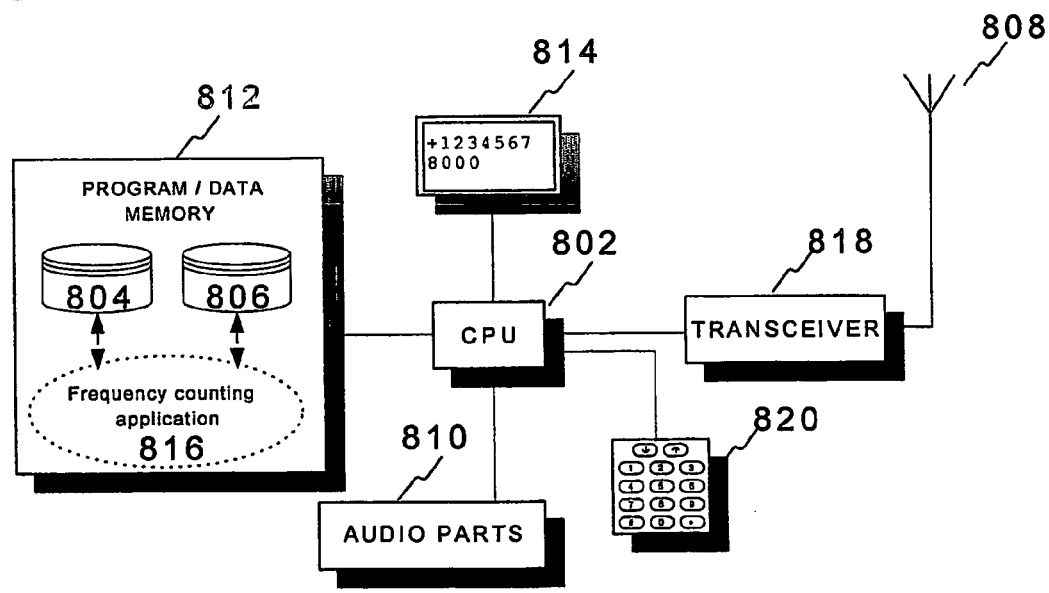
FIG. 8 is a block diagram of a device, in this example substantially a mobile terminal, capable of calculating frequencies according to the invention.

Referring to FIG. 8, one option for the basic components of a device, substantially a personal communications device like a mobile terminal, capable of calculating and storing frequencies of events are depicted. A memory, divided into one or more physical memory chips, 812 comprises primary 804 and secondary 806 storages and instructions 816, e.g. in a form of a computer program/application, for the proposed method. A processing unit 802 is required for the actual execution of the method in accordance with stored instructions 816 and data 804, 806. A display 814 and a user interface 820 are typically needed for providing necessary device control and data visualization means to the user. Transceiver 818 handles data transmission over an air interface 808. Audio parts 810 include e.g. transducers and amplifiers necessary for interfacing acoustic signals such as speech and music with said device.

The scope of the invention can be found in the following independent claims. However, utilized devices, event types, storage structures etc may vary significantly depending on the current scenario, still converging to the basic ideas of this invention. For example, it is clear that the proposed method may in practise be implemented in almost any kind of advanced electronic device substantially including a computer, like a PDA or a desktop/portable PC, comprising means for storing and processing data. In addition, the primary and secondary storages may be constructed in a variety of ways as long as the primary storage holds the event data in detail and the secondary storage works as a less detailed intermediate storage. The storages may even be partially combined as the frequency data for both the storages can be stored in a certain memory location whereas the event identification data for the primary storage only or for the secondary storage as well can be placed together. However, in any case there must be a linkage between the frequency data and available event identification data so that on a conceptual level at least two storages, a primary one with possibly distributed event type identification and frequency data information units and a secondary one with at least the frequency data, still exist with different levels of detail. Therefore, the invention is not strictly limited to the embodiments described above.

REFERENCES

[1] Brown, B. & Sellen, A. (2001), "Exploring Users' Experiences of the Web". First Monday (http://www.firstmonday.org/issues/issue6_9/brown/index.html)
[2] Cockburn, A. & Mckenzie, B. (2000), "What Do Web Users Do? An Empirical Analysis of Web Use", Int. J. Human-Computer Studies (http://www.cosc.canterbury.ac.nz/~andy/papers/ijhcsAnalysis.pdf)
[3] Ramsay, M. & Nielsen, J. (2000), "WAP Usability". Field study report

The invention claimed is:

1. A method for counting frequency of events to be performed by an electronic device, said method comprising:
    defining an event type the frequency of which is to be counted,
    detecting an event of the event type to be counted when occurred,
    storing frequency information for the event type in one of a primary storage of one or more memory units used by the electronic device or a secondary storage of one or more memory units used by the electronic device, the frequency information for an event type stored in the primary storage comprising more information about the event type than the frequency information for the event type stored in the secondary storage, the storing frequency information comprising:
    checking if the event type is already included in the primary storage with more detail concerning the event type, and
    if included, increasing a count for the event type in the primary storage with more detail concerning the event type,
    otherwise, if the event type is not included in the primary storage, updating a count for the event type in the secondary storage with less detail concerning the event type,
    wherein the frequency information for the events is stored as event type identifier/frequency count pairs and wherein event type identifier is an output of a hash function.

2. The method of claim 1, wherein said updating comprises at least one of the following actions: creating a storage element related to the event type, initializing a count value for the event type, increasing count.

3. The method of claim 1, further comprises moving the event type in the secondary storage to the primary storage if a predefined condition for the count of said event type in comparison with a count of an event type in the primary storage is fulfilled.

4. The method of claim 3, wherein the fulfillment of the condition requires that the count of the event type in the secondary storage is equal or higher to the count of the event type in the primary storage.

5. The method of claim 3, further comprises moving the event type in the primary storage to the secondary storage.

6. The method of claim 3, wherein the count of the event type in the primary storage is the lowest or highest count of said storage.

7. The method of claim 3, further comprises sorting the primary storage.

8. The method of claim 1, further comprises sorting the storage whereto the count was added.

9. The method of claim 1, wherein the secondary storage is indexed by an output from a hash function using an event type or a derivative thereof as an input.

10. The method of claim 1, wherein the frequency count of an event type is weighted with a weighting factor whenever a predefined action triggering the weighting occurs.

11. The method of claim 1, wherein the event the frequency of which is to be counted is at least one of following: an Internet page access, an Internet site access, phone menu access, file access, word recognition event, voice command event, text autocompletion event, or hand-written character recognition event.

12. The method of claim 11, wherein said Internet page is a world wide web or wireless application protocol page.

13. The method of claim 11, wherein the event types form a recommendation list for an Internet browser.

14. The method of claim 1, wherein said frequency information is user account specific.

15. The method of claim 1, wherein said frequency information is at least partially stored on a portable medium.

16. The method of claim 15, wherein said portable medium is a memory card.

17. The method of claim 16, wherein said memory card is a subscriber identity module card.

18. A non-transitory computer readable storage medium embodying a computer program comprising instructions configured to perform, when said program is run on a computer, a method for counting frequency of events, said method comprising:
defining an event type the frequency of which is to be counted,
detecting an event of the event type to be counted when occurred,
storing frequency information for the event type in one of a primary storage of one or more memory units used by an electronic device or a secondary storage of one or more memory units used by the electronic device, the frequency information for an event type stored in the primary storage comprising more information about the event type than the frequency information for the event type stored in the secondary storage, the storing frequency information comprising:
checking if the event type is already included in the primary storage with more detail concerning the event type, and
if included, increasing a count for the event type in the primary storage with more detail concerning the event type,
otherwise, if the event type is not included in the primary storage, updating a count for the event type in the secondary storage with less detail concerning the event type,
wherein the frequency information for the events is stored as event type identifier/frequency count pairs and wherein event type identifier is an output of a hash function.

19. The non-transitory computer readable storage medium of claim 18 further configured to form a recommendation list for a browser based on the frequency information, wherein event data stored in the primary and secondary storages at least partly relates to accessed destination addresses in the browser.

20. The non-transitory computer readable storage memory of claim 19, wherein said accessed destination addresses relate to Internet sites and pages thereof.

21. The non-transitory computer readable storage memory of claim 19, wherein event type specific elements in the primary or secondary storage comprise at least one of the following information units: event type identifier, site name, page name, site universal resource locator, page universal resource locator.

22. The non-transitory computer readable storage memory of claim 20, wherein recommendations constructed from the stored event data are recommendations at a site level.

23. The non-transitory computer readable storage memory of claim 20, wherein recommendations constructed from the stored event data are recommendations at a page level.

24. The non-transitory computer readable storage memory of claim 19, wherein recommendations are displayed to the user as a hierarchical structure comprising at least two levels.

25. The non-transitory computer readable storage memory of claim 24, wherein said levels include a level for sites and a level for corresponding pages.

26. The non-transitory computer readable storage memory of claim 19, wherein recommendations are configured to a user context.

27. The non-transitory computer readable storage memory of claim 19, wherein time elapsed from at least one previous access of an event type affects the position of the event type in the primary or secondary storage or in a displayed list of recommendations.

28. The non-transitory computer readable storage memory of claim 20, wherein recommendations are displayed to the user as a hierarchical structure of pages and subpages thereof.

29. The non-transitory computer readable storage memory of claim 28, wherein the order of said subpages displayed to the user is affected by time elapsed from at least one previous access of said subpages.

30. The non-transitory computer readable storage memory of claim 18, wherein a count for a certain event type is adjusted by a fixed value independent of the number of event type accesses during a session if accessed more than once.

31. The non-transitory computer readable storage memory of claim 20, wherein links in a page are displayed sorted by the frequency count.

32. The non-transitory computer readable storage memory of claim 18 further configured to sort options for completing a partially written character string, said options belonging to a set of event types the frequency of which is counted, according to the frequency count thereof.

33. The non-transitory computer readable storage memory of claim 18 for ranking user defined links in a browser, wherein said links belong to a set of event types the frequency of which is counted, said links being sorted by the frequency count.

34. The non-transitory computer readable storage memory of claim 18, wherein said computer is a personal computer, a personal digital assistant or a mobile terminal.

35. The non-transitory computer readable storage memory of claim 27, wherein said time elapsed from at least one previous access is measured as the number of sessions or as a calendar time.

36. An electronic device operable in a telecommunications network, comprising:
- at least one processor; and
- at least one memory, including instructions, the at least one memory and the instructions being configured to, in cooperation with the at least one processor, cause the electronic device to:
    - define an event type the frequency of which is to be counted,
    - detect an event of the event type to be counted when occurred,
    - store frequency information for the event type in one of a primary storage of one or more memory units used by an electronic device or a secondary storage of one or more memory units used by the electronic device, the frequency information for an event type stored in the primary storage comprising more information about the event type than the frequency information for the event type stored in the secondary storage, the storing frequency information comprising:
        - check if the event type was already included in the primary storage with more detail concerning the event type, and
        - increase a count for the event type in the primary storage with more detail concerning the event type, if the event type was already included in the primary storage with more detail concerning the event type,
        - otherwise, if the event type is not included in the primary storage, update a count for the event type in the secondary storage with less detail concerning the event type,
    - wherein the frequency information for the events is stored as event type identifier/frequency count pairs and wherein event type identifier is an output of a hash function.

37. The electronic device of claim 36, wherein said updating comprises at least one of the following actions: creating a storage element related to the event type, initializing a count value for the event type, increasing count.

38. The electronic device of claim 36, further arranged to move the event type in the secondary storage to the primary storage if a predefined condition for the count of the event type in comparison with a count of an event type in the primary storage is fulfilled.

39. The electronic device of claim 36, further arranged to move the event type in the primary storage to the secondary storage.

40. The electronic device of claim 36, wherein said frequency information is stored on a subscriber identity module card.

41. The electronic device of claim 36, wherein said frequency information is user account specific.

42. The electronic device of claim 36, arranged to form a recommendation list for a browser based on the frequency information, wherein event data stored in the primary and secondary storages at least partly relates to destination addresses accessed through the browser.

43. The electronic device of claim 42, wherein said accessed destination addresses relate to Internet sites and pages thereof.

44. The electronic device of claim 41, wherein event type specific elements in the primary or secondary storage relate to at least one of the following information units: event type identifier, site name, page name, site universal resource locator, page universal resource locator.

45. The electronic device of claim 43, wherein links in a page are displayed sorted by the frequency count.

46. The electronic device of claim 36, arranged to sort options for completing a partially written character string, said options belonging to a set of event types the frequency of which is counted, according to the frequency count thereof.

47. The electronic device of claim 46, wherein said character strings relate to Internet sites or pages.

48. The electronic device of claim 36, arranged to rank user defined links in a browser, wherein said links belong to a set of event types the frequency of which is counted, said links being sorted by the frequency count.

49. The electronic device of claim 36, which is a global system for mobile communications or universal mobile telecommunications system terminal.

\* \* \* \* \*